(12) United States Patent
Ke et al.

(10) Patent No.: US 8,542,317 B2
(45) Date of Patent: Sep. 24, 2013

(54) IMAGING DEVICE WITH TRANSPARENT DUST-PROOFING MEMBER

(75) Inventors: Chau-Yuan Ke, New Taipei (TW); Yu-Bin Wang, New Taipei (TW)

(73) Assignee: Wcube Co., Ltd., George Town (KY)

( * ) Notice: Subject to any disclaimer, the term of this patent is extended or adjusted under 35 U.S.C. 154(b) by 11 days.

(21) Appl. No.: 13/283,592

(22) Filed: Oct. 28, 2011

(65) Prior Publication Data

US 2013/0038776 A1 Feb. 14, 2013

(30) Foreign Application Priority Data

Aug. 11, 2011 (TW) .................................. 100128639

(51) Int. Cl.
*H04N 5/225* (2006.01)

(52) U.S. Cl.
USPC .......................................... 348/374; 257/433

(58) Field of Classification Search
USPC .......... 348/373–374; 250/239; 257/433–434
See application file for complete search history.

(56) References Cited

U.S. PATENT DOCUMENTS

| 7,600,930 B2 * | 10/2009 | Wang et al. ................... 396/448 |
| 7,632,026 B2 * | 12/2009 | Lee ................................. 396/529 |
| 7,893,572 B2 * | 2/2011 | Pettitt et al. ...................... 310/51 |
| 7,959,364 B2 * | 6/2011 | Wu ................................. 396/448 |
| 2011/0063739 A1 * | 3/2011 | Hirata et al. ................... 359/819 |
| 2011/0235194 A1 * | 9/2011 | Nobe et al. ..................... 359/823 |

* cited by examiner

*Primary Examiner* — Ngoc-Yen Vu
(74) *Attorney, Agent, or Firm* — Altis Law Group, Inc.

(57) ABSTRACT

An imaging device includes an auto-focusing actuator, an image sensor, and a transparent dust-proofing member. The auto-focusing actuator includes a housing. The housing includes a top surface and an opposite bottom surface, and defines a through hole extending from the top surface to the bottom surface. A number of positioning rods extend from the top surface and cooperatively define a fixing space. The image sensor is mounted on the bottom surface of the housing and aligned with the through hole. The transparent dust-proofing member is mounted in the fixing space and seals the through hole.

1 Claim, 2 Drawing Sheets

1. Technical Field

The present disclosure relates to an imaging device.

2. Description of Related Art

Many imaging devices include a lens, an auto-focusing actuator, and an image sensor. The auto-focusing actuator usually includes a housing receiving a moving part and a fixed part. The image sensor is mounted in the housing beneath the moving part. Gaps may exist between the moving part and the fixed part. Dust may fall into the image sensor through the gaps and influence the imaging quality of the image sensor.

Therefore, it is desirable to provide an imaging device which can overcome the limitations described.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
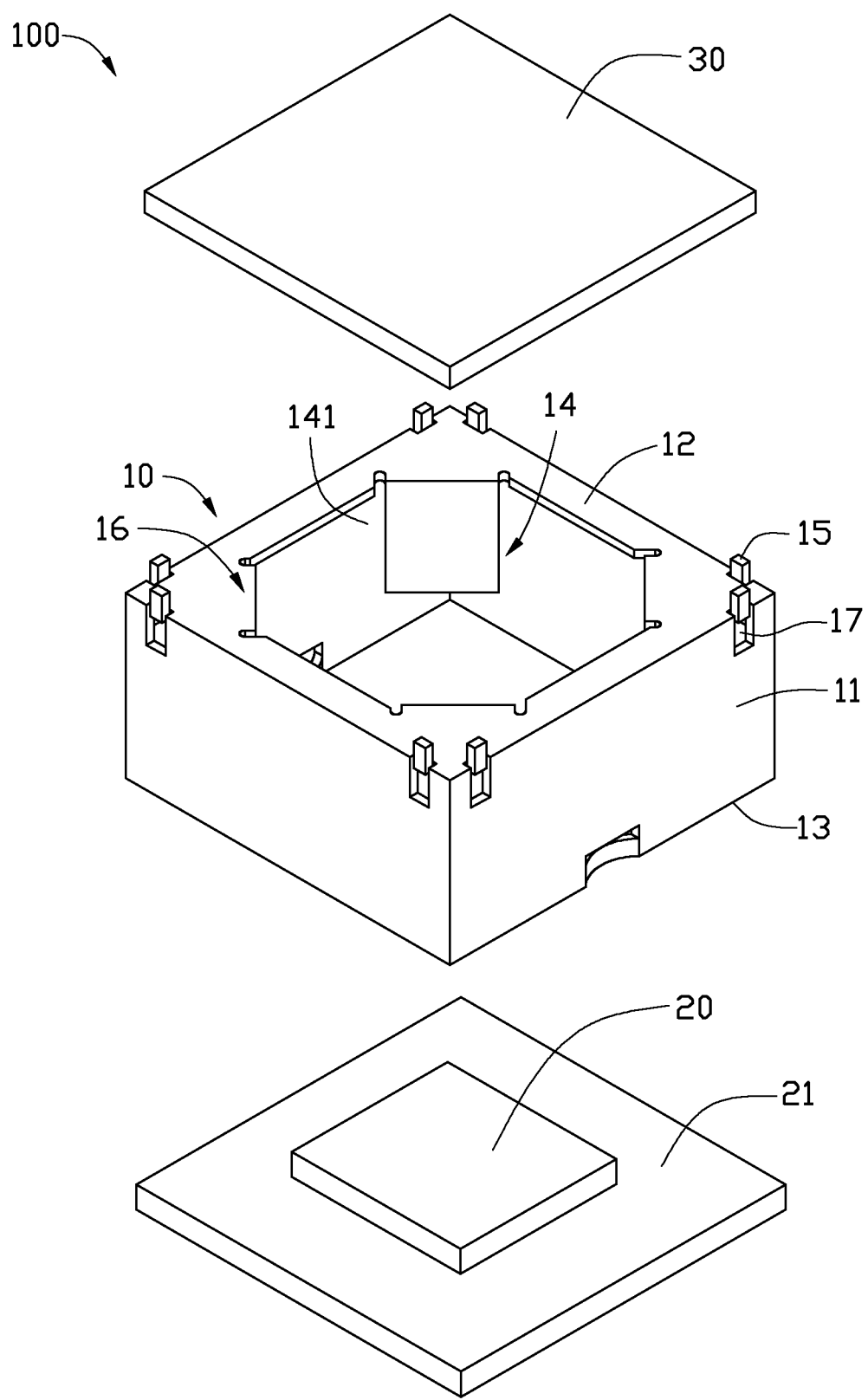
FIG. 1 is a schematic, exploded view of an imaging device according to an exemplary embodiment of the present disclosure.
Figure 2:
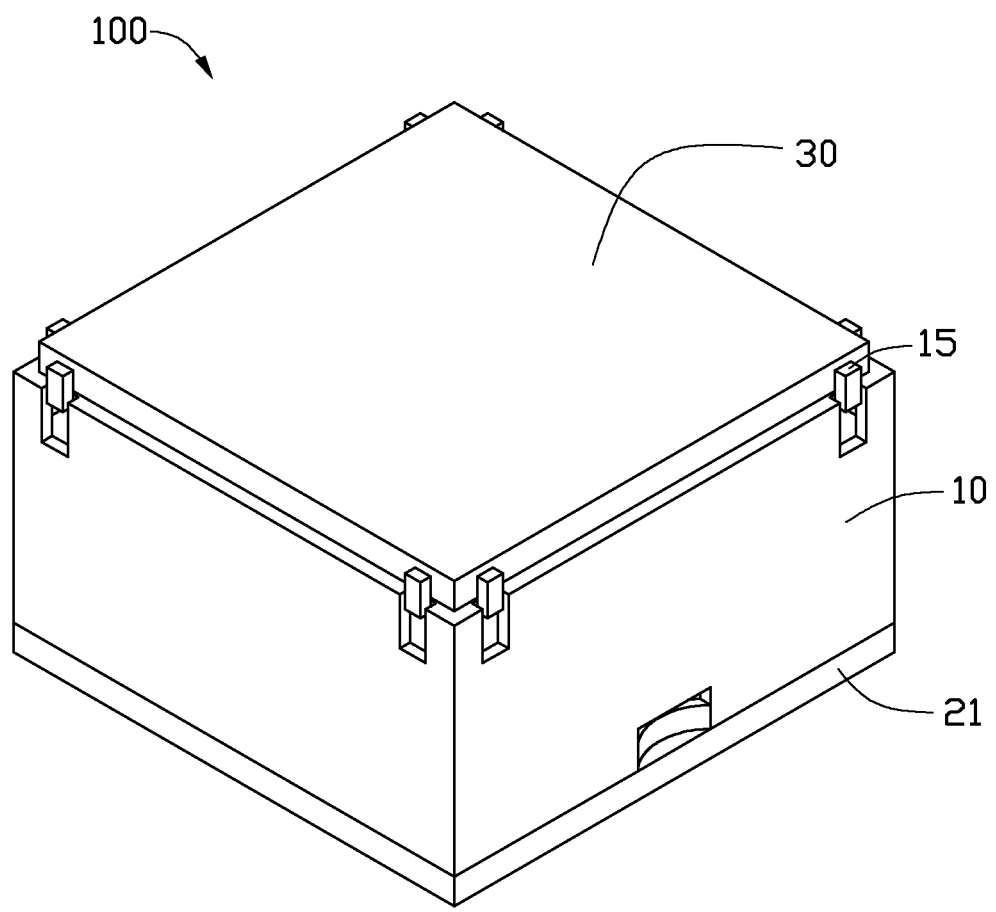
FIG. 2 is a schematic, isometric view of the imaging device of FIG. 1.

Referring to FIGS. 1 and 2, an imaging device 100 according to an exemplary embodiment is disclosed. The imaging device 100 includes an auto-focusing actuator 10, an image sensor 20, and a transparent dust-proofing member 30.

The auto-focusing actuator 10 includes a housing 11. The housing 11 is substantially a cube, and includes a top surface 12 and an opposite bottom surface 13. The housing 11 defines a through hole 14 extending from the top surface 12 to the bottom surface 13. The through hole 14 is configured for receiving components of the auto-focusing actuator 10 and a lens unit (not shown).

The top surface 12 is substantially a flat surface. A number of positioning rods 15 extend from the top surface 12. A number of recesses 17 are defined in sidewalls of the housing 11 and extend through the top surface 12. Each of the recesses 17 is positioned close to a respective one of the positioning rods 15. The positioning rods 15 define a fixing space 16 for receiving the transparent dust-proofing member 30. In this embodiment, there are eight positioning rods 15. There are two positioning rods 15 positioned adjacent to each of the four corners of the top surface 12.

The shape and the size of the transparent dust-proofing member 30 are substantially the same as the shape and size of the fixing space 16. The transparent dust-proofing member 30 is positioned in the fixing space 16 and fixed on the top surface 12 by known means such as glue. The transparent dust-proofing member 30 seals an opening 141 of the through hole 16 defined in the top surface 12. The positioning rods 15 contact with the transparent dust-proofing member 30 to prevent unwanted movement of the transparent dust-proofing member 30. In this embodiment, the transparent dust-proofing member 30 is a piece of glass.

The image sensor 20 is mounted on a circuit board 21. The circuit board 21 is fixed on the bottom surface 13 of the housing 11. The image sensor 20 is aligned with the through hole 16.

As the transparent dust-proofing member 30 seals the through hole 16, dust cannot fall into the through hole 16 and imaging quality of the image sensor 20 can be ensured.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. An imaging device, comprising:
   an auto-focusing actuator comprising a housing, the housing comprising a top surface and an opposite bottom surface, the housing defining a through hole extending from the top surface to the bottom surface, the housing comprising a plurality of positioning rods extending from the top surface, the positioning rods cooperatively defining a fixing space therebetween, the housing defining a number of recesses in its sidewalls, the recesses extending through the top surface, and each of the recesses positioned close to a respective one of the positioning rods;
   an image sensor mounted on the bottom surface of the housing and aligned with the through hole; and
   a transparent dust-proofing member mounted in the fixing space and sealing the through hole, the positioning rods contacting the transparent dust-proofing member.

\* \* \* \* \*